US012390670B2

(12) United States Patent
Magidson et al.

(10) Patent No.: US 12,390,670 B2
(45) Date of Patent: Aug. 19, 2025

(54) DUAL MODE RESPIRATOR

(71) Applicant: Moldex-Metric, Inc., Culver City, CA (US)

(72) Inventors: Mark Magidson, Los Angeles, CA (US); Sukwon Kang, Torrance, CA (US)

(73) Assignee: Moldex-Metric, Inc., Culver City, CA (US)

( * ) Notice: Subject to any disclaimer, the term of this patent is extended or adjusted under 35 U.S.C. 154(b) by 755 days.

(21) Appl. No.: 17/649,243

(22) Filed: Jan. 28, 2022

(65) Prior Publication Data

US 2023/0241424 A1 Aug. 3, 2023

(51) Int. Cl.

*A62B 9/02* (2006.01)
*A62B 7/00* (2006.01)
*A62B 7/10* (2006.01)
*A62B 9/04* (2006.01)

(52) U.S. Cl.

CPC .................. *A62B 9/02* (2013.01); *A62B 7/10* (2013.01); *A62B 9/04* (2013.01)

(58) Field of Classification Search

CPC ................ A62B 9/02; A62B 9/04; A62B 7/10

See application file for complete search history.

(56) References Cited

U.S. PATENT DOCUMENTS

| | | | | |
|---|---|---|---|---|
| 9,643,048 | B1 * | 5/2017 | Danford | A63B 21/00069 |
| 2003/0168060 | A1 * | 9/2003 | Richardson | A62B 18/00 128/201.24 |
| 2015/0151143 | A1 * | 6/2015 | Langford | A62B 18/025 128/205.24 |
| 2020/0061399 | A1 * | 2/2020 | Wade | A62B 18/025 |
| 2021/0386136 | A1 * | 12/2021 | Yates | A41D 13/1138 |
| 2022/0088423 | A1 * | 3/2022 | Mikaelian | F16K 15/148 |
| 2022/0088424 | A1 * | 3/2022 | Mikaelian | A61M 16/202 |

* cited by examiner

*Primary Examiner* — Timothy A Stanis

(74) *Attorney, Agent, or Firm* — Schwegman Lundberg & Woessner, P.A.

(57) ABSTRACT

In some examples, a dual mode respirator comprises a face piece; an inhalation port; an exhalation port; and a port closure movable to close the exhalation port and switch the dual mode respirator from a source control mode to a free exhalation mode of the dual mode respirator.

16 Claims, 7 Drawing Sheets

DUAL MODE RESPIRATOR

TECHNICAL FIELD

The present disclosure relates to a dual mode respirator. Some examples enable source control and free exhalation breathing modes allowing a respirator user to switch back and forth conveniently between the two modes while wearing the respirator.

BACKGROUND

Respirator masks, also known as respirators, are generally used to protect a user against air pollutants or airborne particles while breathing. A closed gas compartment, which is separated from the environment, is formed for the user by means of a mask body that can be arranged over the user's mouth and nose. By means of at least one exhalation valve and at least one inhalation valve both of which are arranged on the mask body and penetrate the same, a gas or air exchange can then take place between the user and the environment through the mask body. In addition, the mask bodies usually, comprise coupling elements wherein one or more head fastening straps can be fastened to the coupling elements and, when tightened around the back of the user's head, pull the respirator against the user's face to ensure that the respirator tightly lies against the face.

With the advent of the Covid pandemic and other airborne diseases, the use of masks and respirators has increased significantly. Some conventional respirators have a source control-breathing configuration. No exhalation port or valve is typically provided in this configuration. This source control configuration is fixed and intended to restrict free exhalation and control the source of a user's exhaled breath to prevent spread of viruses that could be transmitted via exhaled airborne particles.

One problem with respirators having a fixed source control configuration is that heat and moisture can quickly build up inside the face piece and become uncomfortable. This heat and moisture build up cannot easily be removed without tearing off the respirator. This is not convenient or safe when seeking to restrict the spread of airborne viruses, or when working in close environments with other colleagues. In extreme cases, a user might even be tempted not to use a respirator, completely negating its intended use and safety function.

SUMMARY

In some examples, the present disclosure addresses a need to maintain a fixed source control when required but allows the user to select a second mode of operation that allows for the evacuation of heat and moisture through an exhalation valve at those times when the exhalation of the user's breath does not pose a risk to others, while maintaining protection for the user and not requiring the removal of the respirator.

Thus, in some examples, a dual mode respirator comprises a face piece; an inhalation port; an exhalation port; and a port closure movable to close the exhalation port and switch the dual mode respirator from a source control mode to a free exhalation mode of the dual mode respirator.

In some examples, the dual mode respirator further comprises a first valve diaphragm associated with the inhalation port, and a second valve diaphragm associated with the exhalation port or the port closure, the first valve diaphragm and the second valve diaphragm respectively operable to open or close the inhalation port and the exhalation port under air pressure fluctuations within the dual mode respirator in use.

In some examples, the port closure is generally coin-shaped and sized to close the exhalation port when moved to a closing position of the exhalation port in a source control mode of the dual mode respirator.

In some examples, the port closure is movable within the face piece in a circular path around a rotation axis.

In some examples, the port closure has a flat surface sized to close the exhalation port in the source control mode of the dual mode respirator.

In some examples, the circular path is coincident with or parallel to a plane of the flat surface of the port closure.

In some examples, the dual mode respirator further comprises an exoskeleton supported in an opening of a face piece.

In some examples, a rotation axis is defined by a shaft mounted rotatably in the exoskeleton, the shaft extending through the exoskeleton between an internal end and an external end of the shaft.

In some examples, the dual mode respirator further comprises an internal lever, the internal lever connected to the internal end of the shaft.

In some examples, the port closure is connected to the internal lever and is rotatable about the rotation axis under action of the internal lever.

In some examples, the dual mode respirator further comprises an external lever, the external lever connected to the external end of the shaft.

In some examples, the external lever is operable by a user to switch the dual mode respirator between the source control mode and a free exhalation mode of the dual mode respirator.

In some examples, the exhalation port is positioned above the exhalation port in the exoskeleton or the face piece.

In some examples, the exhalation port is positioned below the exhalation port in the exoskeleton or the face piece.

In some examples, the port closure is pivotable about a hinge to open or close the exhalation port and effect a switch between the source control mode and the free exhalation mode of the dual mode respirator.

In some examples, the port closure is moveable in a linear direction relative to the face piece to open or close the exhalation port and effect a switch between the source control mode and the free exhalation mode of the dual mode respirator.

In some examples, the port closure is vented and carries a diaphragm to open or close vents in the port closure during an inhalation or exhalation of a user.

In some examples, the port closure is unvented.

DESCRIPTION OF THE DRAWINGS

The drawings illustrate generally, by way of example, but not by way of limitation, various embodiments discussed in the present document. For ease of understanding and simplicity, common numbering of elements within the illustrations may be employed where an element is the same in different drawings.

DETAILED DESCRIPTION

Figure 2:
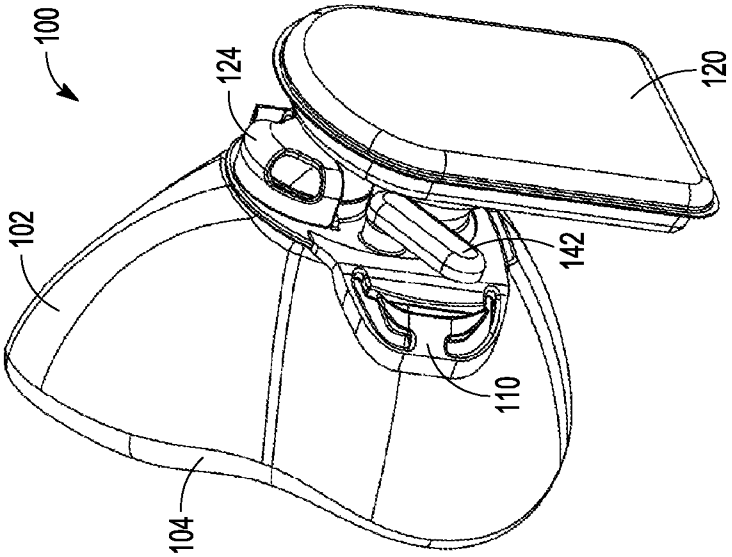
FIG. 2 is a pictorial view of the dual mode respirator of FIG. 1 in a source control-breathing mode, according to an example.
Figure 1:
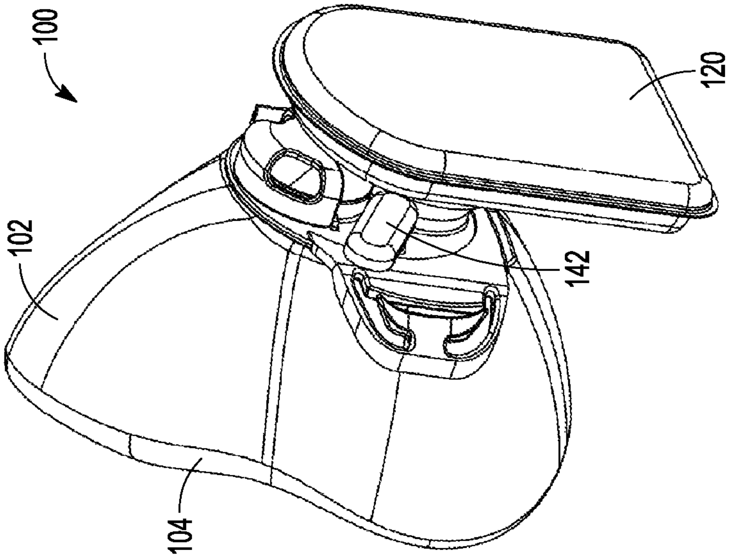
FIG. 1 is a pictorial view of a dual mode respirator in a free exhalation-breathing mode, according to an example.
Figure 4:
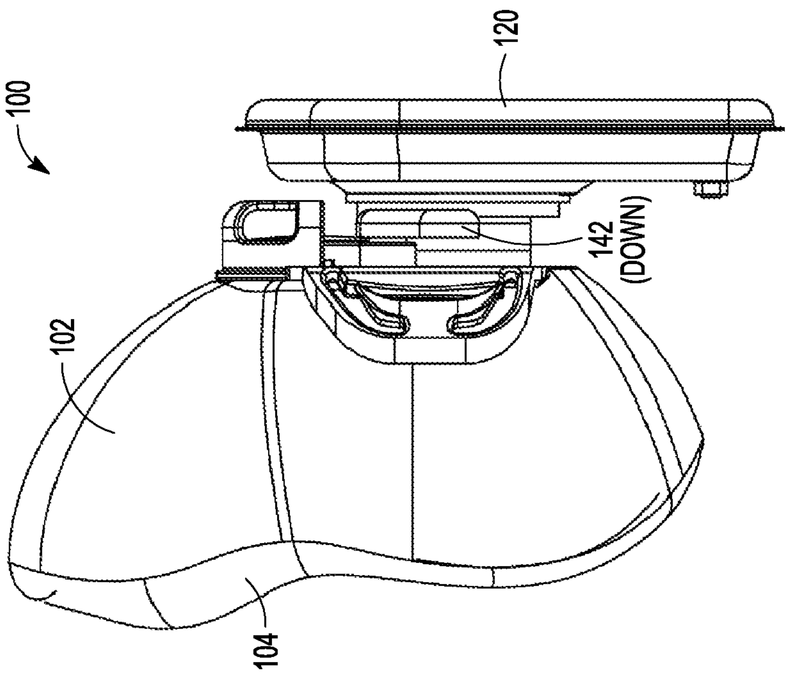
FIG. 4 is a left side view of the dual mode respirator of FIG. 1 in a source control-breathing mode, according to an example.
Figure 3:
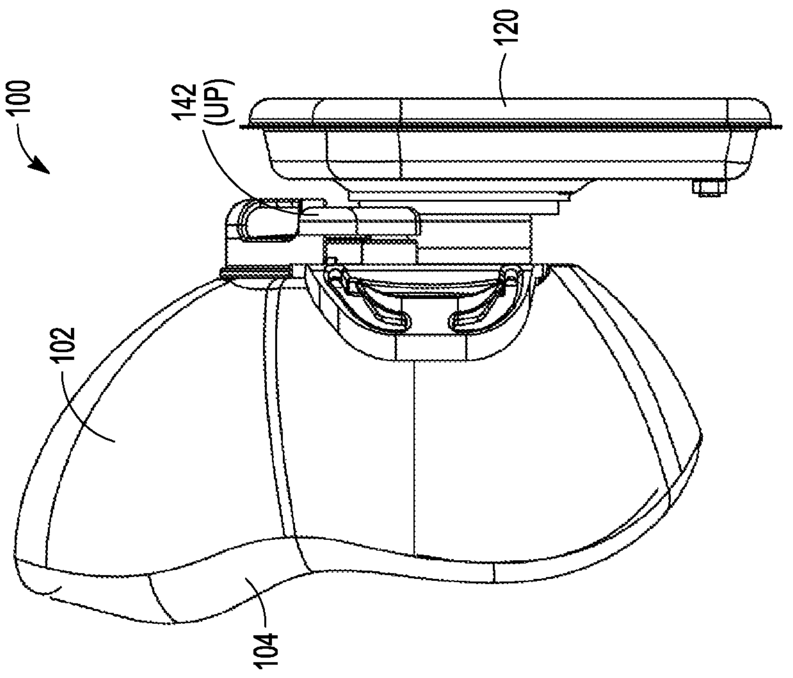
FIG. 3 is a left side view of the dual mode respirator of FIG. 1 in a free exhalation-breathing mode, according to an example.
Figure 6:
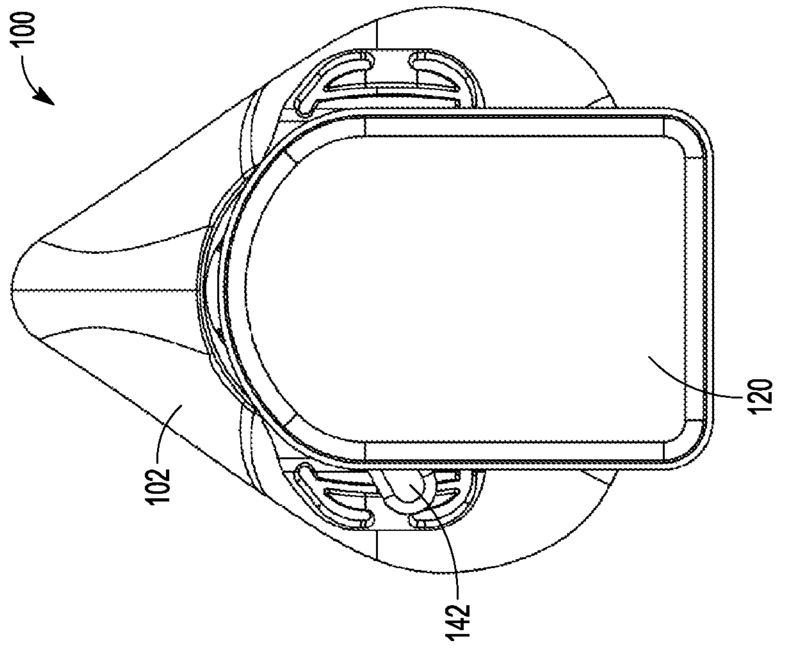
FIG. 6 is a front view of a dual mode respirator FIG. 1 in a source control-breathing mode, according to an example.
Figure 5:
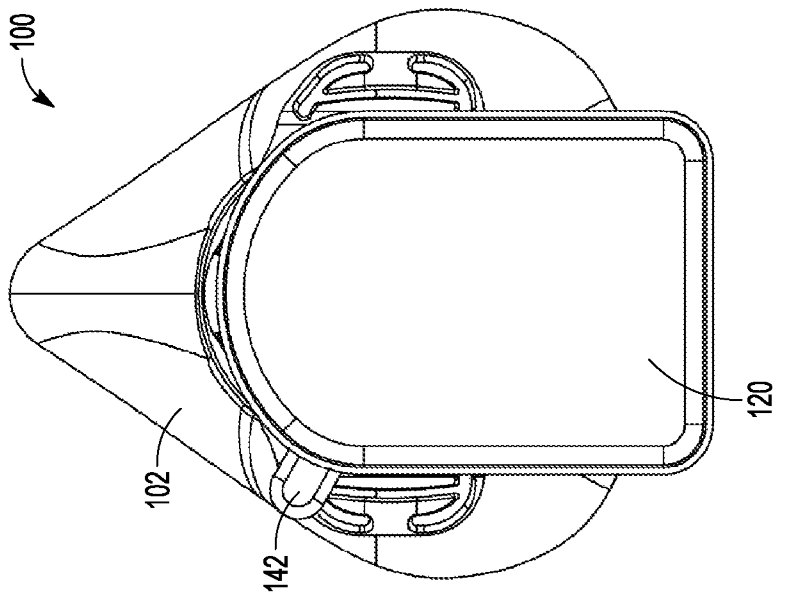
FIG. 5 is a front view of the dual mode respirator FIG. 1 in a free exhalation-breathing mode, according to an example.

The following is a detailed description of illustrative examples of the present disclosure. As these examples are described with reference to the aforementioned drawings, various modifications, or adaptations of the methods and or specific structures described may become apparent to those skilled in the art. All such modifications, adaptations, or variations that rely upon the teachings of the present disclosure, and through which these teachings have advanced the art, are considered to be within the scope of the present disclosure. Hence, these descriptions and drawings are not to be considered in a limiting sense, and the present examples are in no way limited to the embodiments illustrated.

As mentioned above, with the recent advent of pandemics and increased threat of other airborne diseases, the use of masks and respirators has become more prevalent. Some conventional respirators have a source control-breathing configuration in which no exhalation valve is provided. In a source control mode or configuration, a user's inhaled and exhaled breath may pass through a common inhale and exhale orifice or valve. The orifice or valve may be connected to a filter. The source control configuration is fixed and disallows free exhalation of a user's breath. The source of a user's exhaled breath is restricted to prevent spread of viruses that can be transmitted via exhaled airborne particles.

The present inventors have recognized, among other things, that a significant problem with respirators having a source control configuration is that heat and moisture can quickly build up inside the face piece and become uncomfortable. In some instances, a user might be tempted to remove or not even wear a respirator, completely negating its intended use and allowing the free spread of airborne disease.

The present subject matter can help provide a solution to this problem, such as by providing a dual mode respirator enabling dual source control and free exhalation breathing modes. Some present examples allow a respirator wearer to switch back and forth conveniently between the two modes while wearing the respirator. Heat and moisture can be released without having to take the respirator off.

Some examples of a free exhalation-breathing mode enable filtered or non-filtered exhalation. Some examples of a source control-breathing mode enable filtered inhalation and filtered exhalation. Combinations of inhalation and exhalation filtration are possible in the two modes.

The accompanying drawings FIGS. 1-9 illustrate one example of a dual mode respirator according to the present disclosure. Other examples of respirators and respirator configurations are possible, for example shown in FIGS. 10-11. With reference in particular to the exploded view of FIG. 9, a dual mode respirator 100 comprises a face piece 102, which is formed to separate the nose and the mouth of a user from the environment when worn. The face piece 102 includes a flexible sealing lip 104 which faces the user and fits to the shape of the user's face in a gas-tight manner while the respirator 100 is pressed against the user's face. The face piece 102 also includes an opening 106 disposed on the opposite side of the sealing lip 104. An exoskeleton 108 is supported in the opening 106. In some examples, the exoskeleton 108 is formed separately of the face piece 102. In some examples, the exoskeleton is integrally formed with the face piece 102. In the illustrated example, a retaining formation 109 secures the exoskeleton in the opening 106 of the face piece 102. The exoskeleton 108 includes a plurality of strap coupling elements 110, two in the illustrated instance, one on each side of the exoskeleton 108. The ends of a head strap (not shown) may be fitted to the coupling elements 110 and adjusted as desired.

For purposes of explanation, a direction extending generally between the two coupling elements 110 (i.e., across the exoskeleton 108) may be said to represent a transverse direction in relation the dual mode respirator 100 and/or the exoskeleton 108 depending on the context. A direction extending generally towards or away from a user's face (when the dual mode respirator is worn) may be said to represent an axial direction in relation to the dual mode respirator 100 and/or the exoskeleton 108 depending on the context.

The exoskeleton 108 includes an inhalation port 112 and an exhalation port 114. The designations "inhalation" and "exhalation" do not necessarily mean that a designated port operates only in that manner. An inhalation port may allow both inhaled and exhaled air to pass through it, and vice versa, as described in some examples below. In some examples, a valve or valve diaphragm is associated with each of the inhalation and exhalations ports 112 and 114, respectively. For example, a flexible inhale valve diaphragm 116 may be fitted to the exoskeleton 108 in association with the inhalation port 112. A flexible exhale valve diaphragm 118 may be fitted to the exoskeleton 108 in association with the exhalation port 114. The valve diaphragms 116 and 118 can deform or move, under air pressure fluctuations, to open or close the inhalation and exhalation ports 112 and 114. The exhalation port 114 includes a plurality of vents 136 defined by ribs 137, for example.

In the source control mode, the exhalation port 114 is closed by a port closure 126 described more fully below. In some examples, the exhale valve diaphragm 118 is carried on the port closure 126. When switched to the source control mode of the dual mode respirator 100, the exhalation port 114 is closed and both inhaled and exhaled air passes into and out of the face piece 102 through the inhalation port 112 as the user breathes in and out. In some examples, the inhaled and exhaled air is filtered to remove airborne particles or debris. To this end, an external removable filter 120 is fitted to the exoskeleton 108 and surrounds and covers the inhalation port 112. In some examples, the removable filter

120 is sealed to the inhalation port 112 by a gasket 122. Other gasket arrangements and filter configurations are possible. In the source control mode of the dual mode respirator 100, inhaled air is filtered to protect the user, and exhaled air is filtered to remove airborne particles and debris and seek to reduce the transmission or airborne viruses and the like. The exhalation port 114 that would otherwise allow the exit of unfiltered air is closed (for example, see FIG. 8). In some examples, the flexible diaphragm 118 installed on the port closure 126 forms a valve to close the exhalation port 114 (for source control). In some examples, the port closure 126 is vented or has apertures extending through it in an axial direction. The flexible exhale diaphragm 118 seals or opens the vents or apertures to allow or prevent the passage of air through the port closure. In some examples, exhalation though the port closure 126 is disallowed, but inhalation is allowed. Some examples may operate in a reverse configuration i.e., exhalation allowed, inhalation prevented through the port closure 126, or an inhalation port or exhalation port 112 or 114 to which the port closure 126 has been moved to lie adjacent a port. In this sense, the port closure 126 operates as a movable one-way valve. In the source control mode, the port closure 126 is moved away from the inhale opening to allow the user to inhale and exhale through the inhale opening. The configuration of the diaphragm 118 on the port closure 126 is such that exhalation through vents in the exhalation port 114 is prevented.

In some examples, the port closure 126 acts merely as a port occluder and carries no vents or apertures allowing air to pass through it. In these or similar examples, the flexible diaphragm 118 may be mounted on the exoskeleton and arranged directly in association with the exhalation port 114. In these configurations, the port closure 126 may be operated in a similar way, but the air blocking and/or venting occurs directly at the exhalation port 114 and not on the port closure 126.

In some examples, in the free exhalation mode of the dual mode respirator 100, inhaled air again passes into the face piece 102 via the removable filter 120 and the inhalation port 112 but, in this mode, air can be quickly exhaled freely via the exhalation port 114. The exhaled air passes through an exhale valve diaphragm cover 124 to the external surrounding environment. In this free exhalation mode, accumulated heat and moisture that has built up within the dual mode respirator 100, for example during a period of source control use, can be discharged quickly and easily through the exhalation port 114. Without needing to remove the dual mode respirator 100, a user can switch between modes and vent accumulated heat and moisture. For increased safety, a user might choose to vent the mask when distanced safely away from colleagues at a work site, for example. Further details of the mode switching capability are described below.

In some examples, internal or external filters are provided in association with the exhalation port 114. If provided, an exhalation port filter may have a less restrictive filtering performance or capacity than the external filter 120 used for source control purposes. Such an arrangement may enable, in some examples, a compromise between a reduced degree of virus protection but nonetheless acceptable breathability and comfort during the free exhalation mode, while still providing a full degree of virus protection, albeit reduced breathability and comfort in the source control mode.

With reference again to FIG. 9, and as mentioned above, the dual mode respirator 100 includes an exhalation port closure 126. The exhalation port closure 126 is movable to close or open the exhalation port 114. In some examples, the port closure 126 is vented and carries a flexible diaphragm acting in conjunction with the vents (opening or closing them under air pressure fluctuations) to operate as a moveable valve to block or allow the passage of air though the port closure 126, and/or an adjacent port, in an inhale or exhale direction (or vice versa). In some examples, the port closure 126 is not vented and is movable to occlude a port and block the passage of air in both exhale and inhale directions. In some examples, the exhalation port closure 126 is movable to partially, or fully, close the exhalation port 114. In some examples, the exhalation port closure 126 is movable by a user to close the exhalation port 114 to enter the source control mode. In some examples, the port closure 126 remains in a closed position for so long as the source control mode is desired. In some examples, the exhalation port closure 126 is movable by a user to open the exhalation port 114 to enter the free exhalation mode. In some examples, the port closure 126 remains in an open position for so long as the free exhalation mode is desired. In some examples, a user is able to move the port closure 126 to enter or leave either mode of operation i.e., switch between modes with a single movement or manipulation. In some examples, a user can fully close or fully open the exhalation port 114 when switching between the dual modes, but in some examples a partially closed or partially open position of the exhalation port 114 (or inhalation port 112) may be selected by the user if desired.

For the example illustrated in FIGS. 1-9, the port closure 126 is mounted rotatably with respect to the exoskeleton 108 and face piece 102. In some examples, the port closure 126 is generally coin-shaped and sized to occlude or close the exhalation port 114 when moved to a closing position. Other shapes and/or sizes of the port closure 126 are possible. In some examples, the port closure 126 is vented and carries a flexible valving diaphragm 118 as discussed above. In the illustrated example, the port closure 126 is movable within the face piece 102 in a circular path around a rotation axis, described further below in some examples. The port closure has a flat continuous or discontinuous surface sized to close the exhalation valve 114 in the source control mode of the dual mode respirator when the flexible diaphragm 118 seals against the port closure vents (or the solid body of the port closure 126 if unvented). The circular path of the port closure 126 may be coincident with or parallel to the plane of the flat surface of the port closure 126, or the plane of the flexible diaphragm fitted thereto.

In some examples, the rotation axis of the port closure 126 extends in a generally axial direction. In the illustrated example, the rotation axis of the port closure 126 is defined by a shaft 130 described further below. The shaft 130 may extend generally in the axial direction of the dual mode respirator i.e., in a direction toward or away from a user's face. In some examples, the rotation axis may be associated with a center of the port closure 126, or a center of the exhalation port 114, or a center of the exoskeleton 108, or a center of the dual mode respirator 100. In other examples, the rotation axis is off-center of the port closure 126, or off-center of the exhalation port 114, or off-center of the exoskeleton 108, or off-center of the dual mode respirator 100. Other locations of the rotation axis of the port closure are possible.

Figure 8:
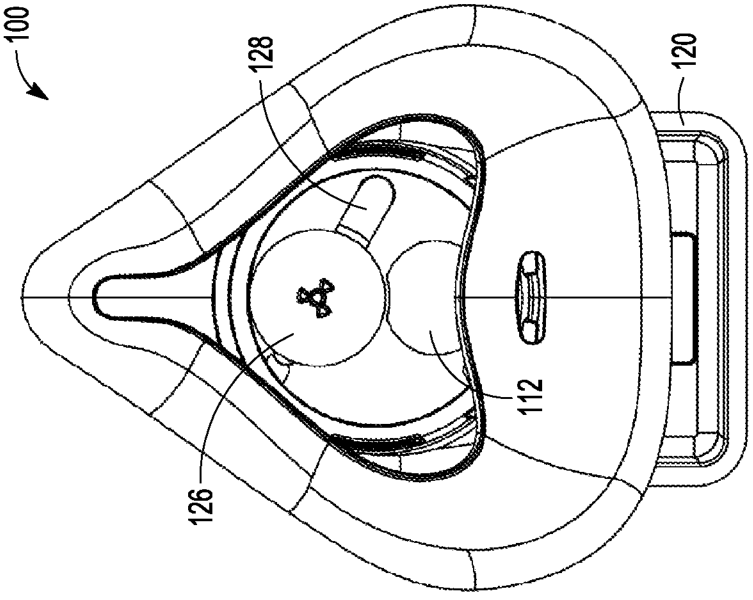
FIG. 8 is a rear view of the dual mode respirator FIG. 1 in a source control-breathing mode, according to an example.
Figure 7:
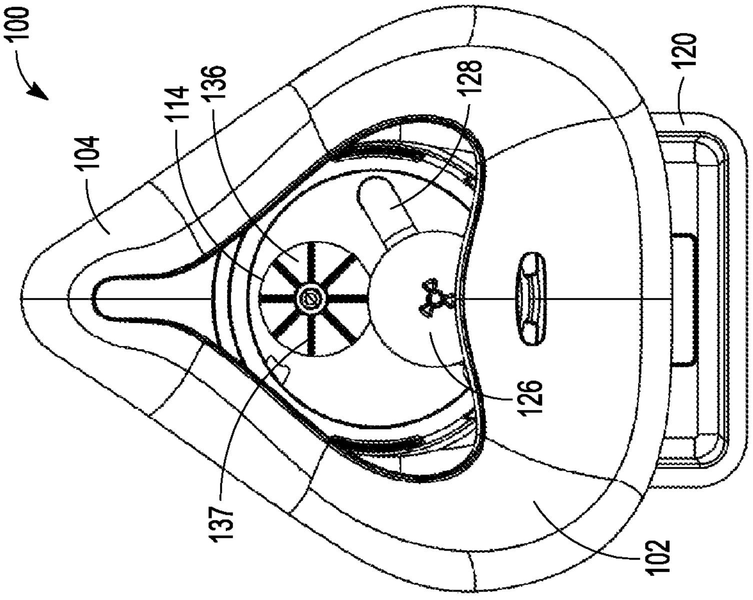
FIG. 7 is a rear view of the dual mode respirator FIG. 1 in a free exhalation-breathing mode, according to an example.
Figure 9:
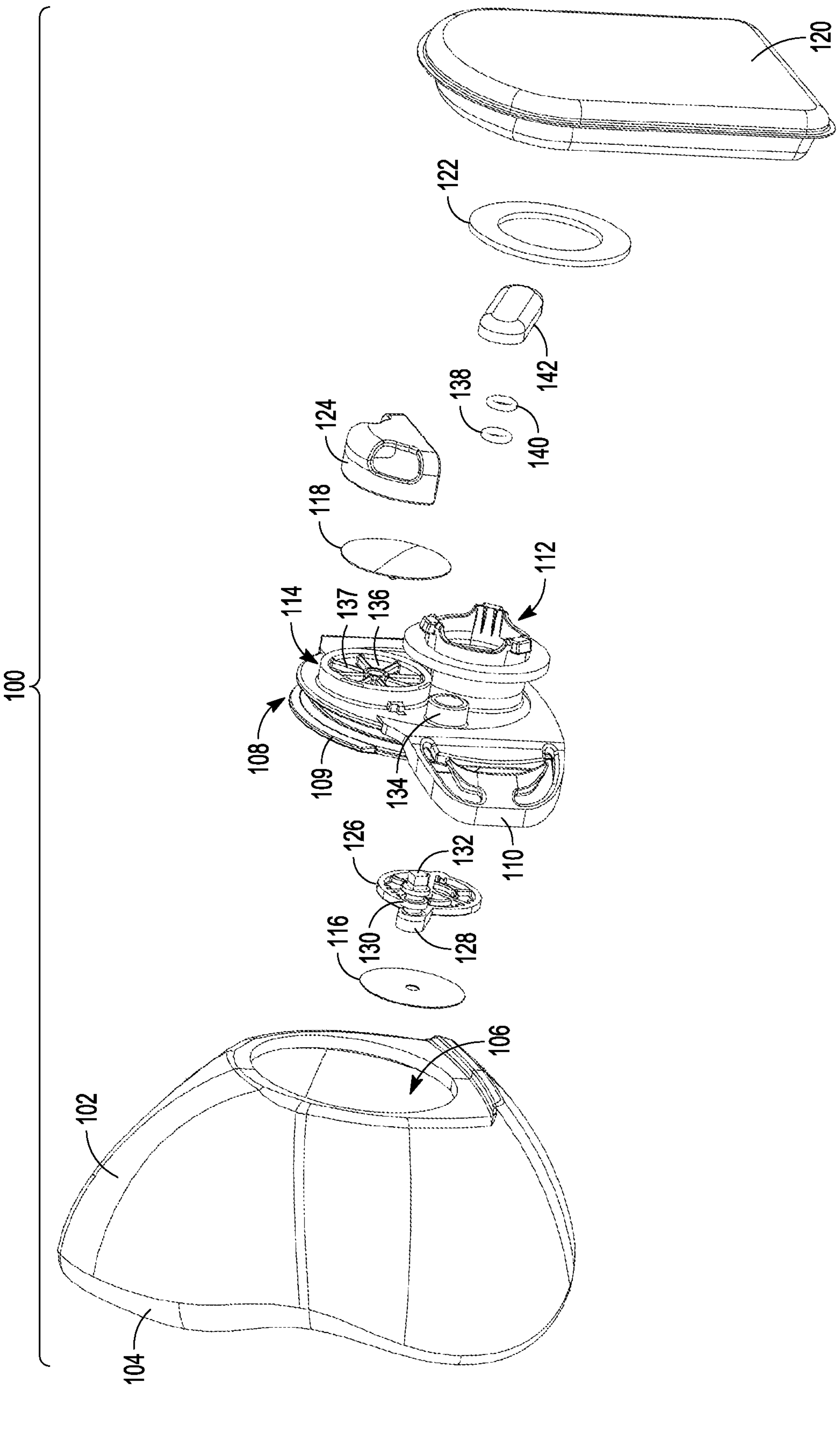
FIG. 9 is an exploded view of the dual mode respirator FIG. 1 illustrating certain components thereof, according to an example.

The port closure 126 is connected to an internal lever 128 (seen more clearly in FIGS. 7-8, for example). The internal lever 128 may be fitted to or formed on a periphery of the port closure 126. The term "internal" in this context is intended to indicate that in use the lever 128 is positioned inside the dual mode respirator 100 when in use. The internal lever 128 extends longitudinally in a direction radially away from the center of the port closure 126.

The axial shaft 130 is located transversely at an outer end of the internal lever 128. In this example, the axially extending shaft 130 defines an axis of rotation of the port closure 126. The axial shaft 130 includes a square head 132 to accept torque applied to a manually operable (user-operated) external lever 142 described further below. The axial shaft 130 is supported rotatably in a short, hollow stem 134 of the exoskeleton 108. The axial shaft 130 is sealed inside the hollow stem 134 by first and second O-rings seals 138 and 140 that sit in complementary grooves formed in the axial shaft 130. With reference to FIGS. 7-8, for example, the internal lever 128 and port closure 126 may be said to define an internal "paddle" that can be rotated by the external lever 142 to open and close the exhalation port 114 to switch the dual mode respirator 100 between the source control and free exhalation modes.

In the illustrated examples, the manually operable external lever 142 is positioned outside the dual mode respirator 100. It can therefore be manipulated by a user when the dual mode respirator 100 is worn. The external lever 142 is fitted to the square head 132 of the axial shaft 130 within the hollow stem 134, such that the external lever 142 can rotate the shaft 130 and the internal lever 128 attached thereto. The internal lever 128 rotates the port closure 126 under manipulation of the external lever 142 applied by a user.

In some examples, the external lever 142 may be fitted to the axial shaft at other locations, for example internally or externally of the exoskeleton 108 or the face piece 102. The external lever 142 can be operated as desired by a user to move, in the illustrated example rotate, the exhalation port closure 126 to selectively open and close the exhalation port 114. The dual-mode respirator 100 can conveniently be switched quickly and easily by a user to adopt either the source control or free exhalation mode of use.

In some examples, the exoskeleton 108 includes one or more detent formations to hold the external lever 142 releasably at each of its two extreme positions in the respective source control and free exhalation modes. This restraint can serve to prevent accidental or unintended lever movements. In some examples, the external lever 142 can be moved up and down to switch between modes and may include a visual cue, for example a tipped or colored end, that is visible (or rendered not visible) as a visual cue in a user's peripheral field of view to indicate a mode status of the dual mode respirator 100.

Figure 10:
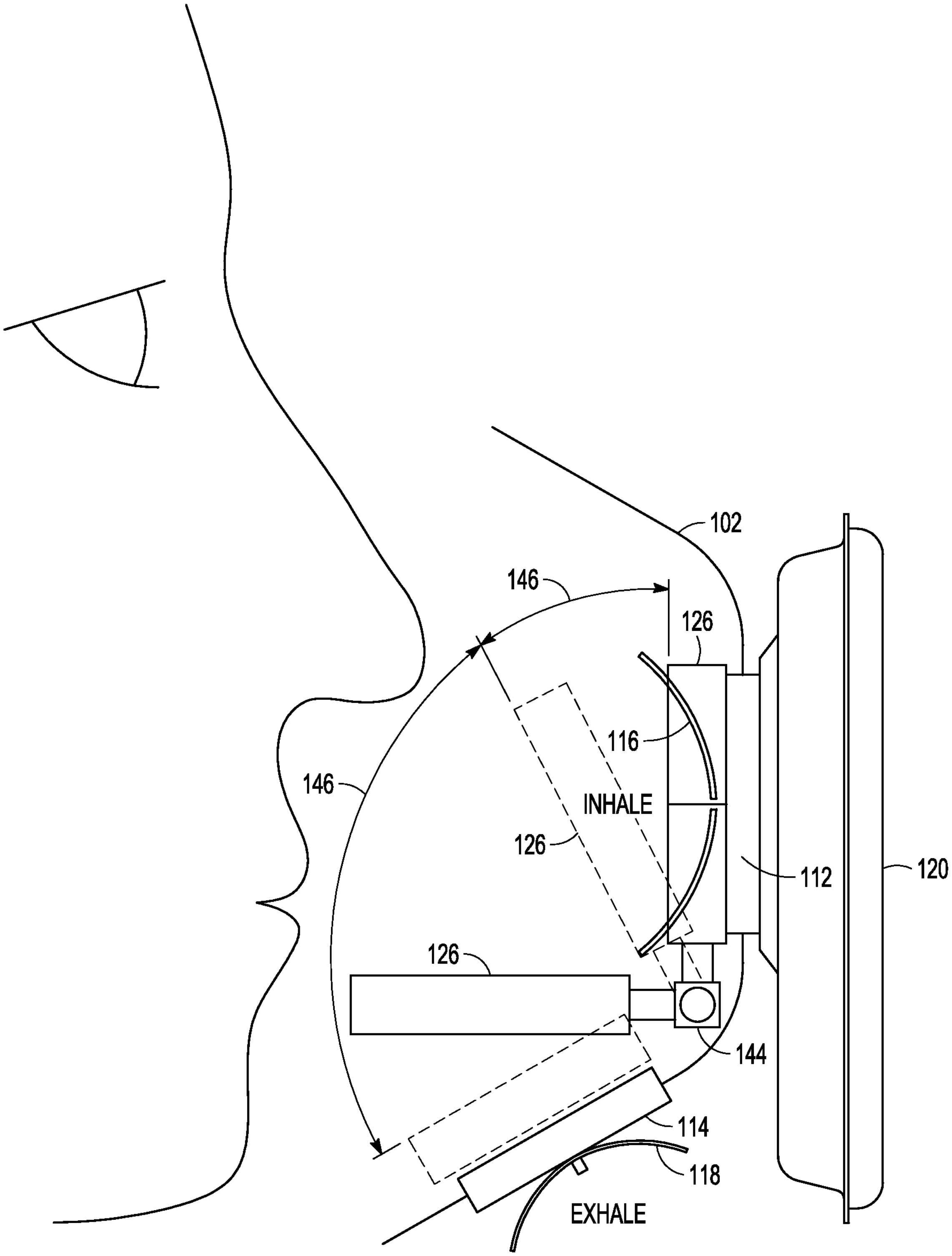
FIG. 10 shows aspects of a dual mode respirator, according to another example.

FIG. 10 illustrates aspects of a further example of a dual mode respirator 100. These example aspects may be combined where appropriate with one or more of the aspects described above. In FIG. 10, a sectional view is shown of an outer portion of a face piece 102 of the dual mode respirator 100 connected to a filter 120. An inhalation port 112 and an exhalation port 114 are shown schematically by rectangles numbered accordingly. In this version of the dual mode respirator 100, the inhalation port 112 lies above the exhalation port 114. The exhalation port 114 vents to the outside environment below the filter 120. The inhalation port 112 is associated with a flexible inhale valve diaphragm 116 and the exhalation port is associated with an exhale-valve diaphragm 118. The valve diaphragms 116 and 118 are shown schematically can deform or move under air pressure fluctuations to act as valves for their respective ports 112 and 114 in the manner described above.

In this example, a port closure 126 is movable (pivotable) both to open and close the exhalation port 114 and to open and close the inhalation port 112. In some examples, when the exhalation port 114 is closed, the inhalation port 112 is open, and vice versa. In some examples, the port closure 126 can adopt or pass through an intermediate position as indicated in dotted outline. In the illustrated example, the port-closure 126 is supported movably by hinge 144 disposed inside the face piece 102. The hinge 144 may be provided by an exoskeleton (not shown) or in the face piece 102.

The port closure 126 is pivotable as shown by arrows 146 in a direction generally orthogonal to the transverse plane of the port closure 126. Moving fully from one position to an opposed position at the ends of the arrows 146 switches the dual mode respirator 100 from a source control mode to a free exhalation mode. In some positions of the port closure 126, for example when the inhalation port 112 is closed, both inhaled and exhaled air passes through the open exhalation port 114. In this situation, neither the inhaled or exhaled air is filtered and the dual mode respirator 100 is entirely free flowing in a free exhalation and free inhalation configuration. In some examples, dual modes enabled by the dual mode respirator include fully filtered (for both inhale and exhale) in which the exhalation port 114 is always blocked by the port closure 126, or fully unfiltered (for both inhale and exhale) in which the inhalation port 112 is always blocked by the port closure 126.

Figure 11:
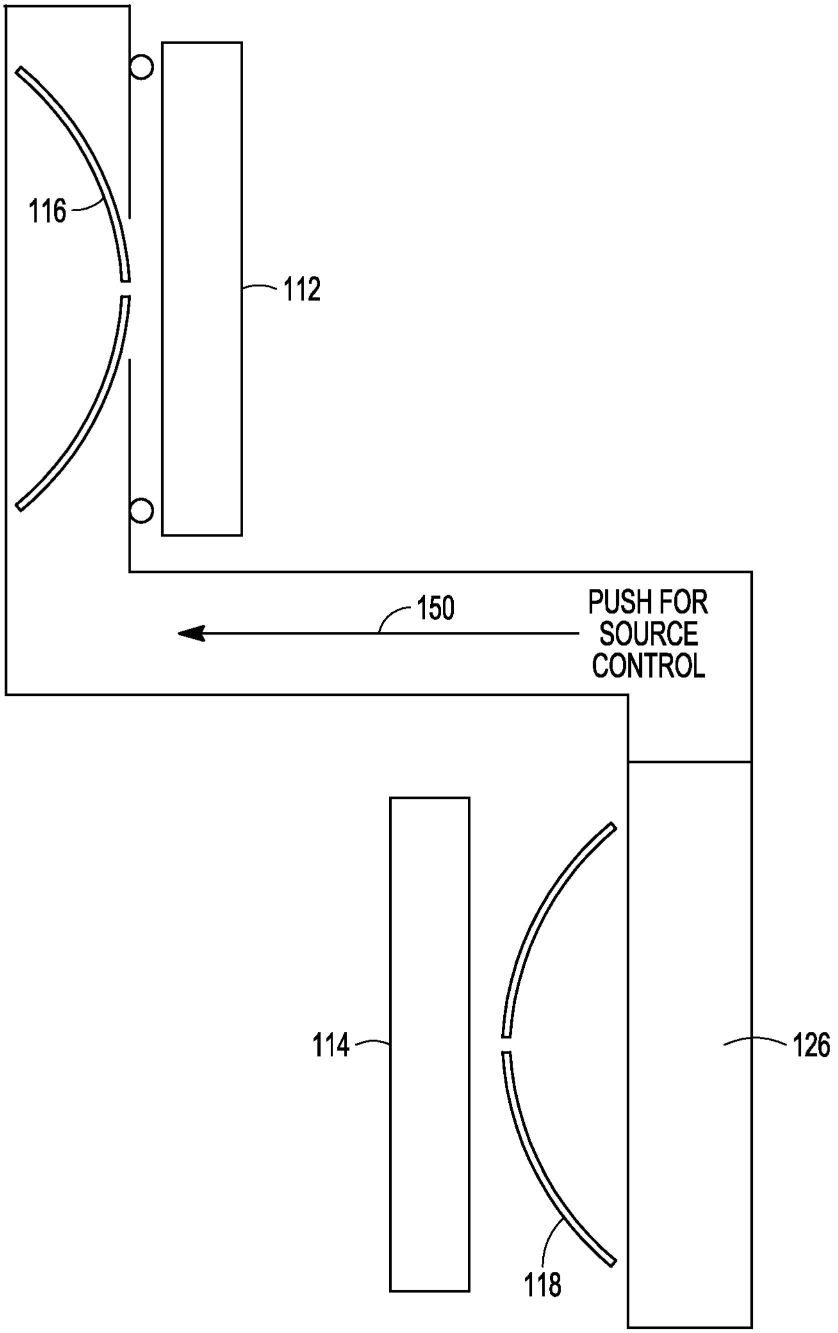
FIG. 11 shows aspects of a dual mode respirator, according to yet another example.

Referring now to FIG. 11, an alternate configuration of a port closure 126 for a dual mode respirator 100 is shown. Example inhalation and exhalation ports 112 and 114, and associated valve diaphragms 116 and 118, are shown schematically and numbered as above. Here, a linear push action on the port closure 126 in the direction of the arrow 150 closes the exhalation port 114 to enter the source control mode of the dual mode respirator. The linear push action may occur in a generally axial or transverse direction of the dual mode respirator 100.

In the illustrated example, the push action simultaneously opens the inhalation port 112. A linear pull action or retraction on the port closure 126 by a user has the reverse effect to enter the free exhalation mode. The linear pull action or retraction may occur in a generally axial or transverse direction of the dual mode respirator. In some examples, a dog-legged configuration of the port closure 126 as illustrated can facilitate a simultaneous switch between the two modes. Other push-pull configurations and arrangements are possible.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the embodiments should be determined with reference to the appended claims, along with the full scope of equivalents to which such claims are entitled.

The invention claimed is:

1. A dual mode respirator comprising:

a face piece;

an inhalation port;

an exhalation port;

a port closure movable to close the exhalation port and switch the dual mode respirator from a source control mode to a free exhalation mode of the dual mode respirator;

an exoskeleton supported in an opening of the face piece, wherein a rotation to move the port closure to effect a switch from the source control mode to the free exhalation mode is provided by a shaft mounted rotatably in the exoskeleton, the shaft extending through the exoskeleton between an internal end and an external end of the shaft; and an internal lever connected to the internal end of the shaft.

2. The dual mode respirator of claim 1, further comprising a first valve diaphragm associated with the inhalation port, and a second valve diaphragm associated with the exhalation port or the port closure, the first valve diaphragm and the second valve diaphragm respectively operable to open or close the inhalation port and the exhalation port under air pressure fluctuations within the dual mode respirator in use.

3. The dual mode respirator of claim 1, wherein the port closure is generally coin-shaped and sized to close the exhalation port when moved to a closing position of the exhalation port in a source control mode of the dual mode respirator.

4. The dual mode respirator of claim 1, wherein the port closure is movable within the face piece in a circular path around a rotation axis.

5. The dual mode respirator of claim 4, wherein the port closure has a flat surface sized to close the exhalation port in the source control mode of the dual mode respirator.

6. The dual mode respirator of claim 5, wherein the circular path is coincident with or parallel to a plane of the flat surface of the port closure.

7. The dual mode respirator of claim 1, wherein the port closure is connected to the internal lever and is rotatable about the shaft under action of the internal lever.

8. The dual mode respirator of claim 7, further comprising an external lever, the external lever connected to the external end of the shaft.

9. The dual mode respirator of claim 8, wherein the external lever is operable by a user to switch the dual mode respirator between the source control mode and a free exhalation mode of the dual mode respirator.

10. The dual mode respirator of claim 1, wherein the exhalation port is positioned above the inhalation port in the exoskeleton or the face piece.

11. The dual mode respirator of claim 1, wherein the exhalation port is positioned below the inhalation port in the exoskeleton or the face piece.

12. The dual mode respirator of claim 1, wherein the port closure is pivotable about a hinge to open or close the exhalation port and effect a switch between the source control mode and the free exhalation mode of the dual mode respirator.

13. The dual mode respirator of claim 1, wherein the port closure is moveable in a linear direction relative to the face piece to open or close the exhalation port and effect a switch between the source control mode and the free exhalation mode of the dual mode respirator.

14. The dual mode respirator of claim 1, wherein the port closure is vented and carries a diaphragm to open or close vents in the port closure during an inhalation or exhalation of a user.

15. The dual mode respirator of claim 1, wherein the port closure is unvented.

16. A dual mode respirator comprising:

a face piece;

an inhalation port;

an exhalation port; and a port closure movable to close the exhalation port and switch the dual mode respirator from a source control mode to a free exhalation mode of the dual mode respirator, wherein the port closure is manually movable by a user to pivot about a hinge to open or close the exhalation port and effect a switch between the source control mode and the free exhalation mode of the dual mode respirator.

* * * * *